June 30, 1959 W. R. KING 2,892,684
METHOD AND APPARATUS FOR CARBON BLACK PRODUCTION
Filed April 9, 1956 2 Sheets-Sheet 1
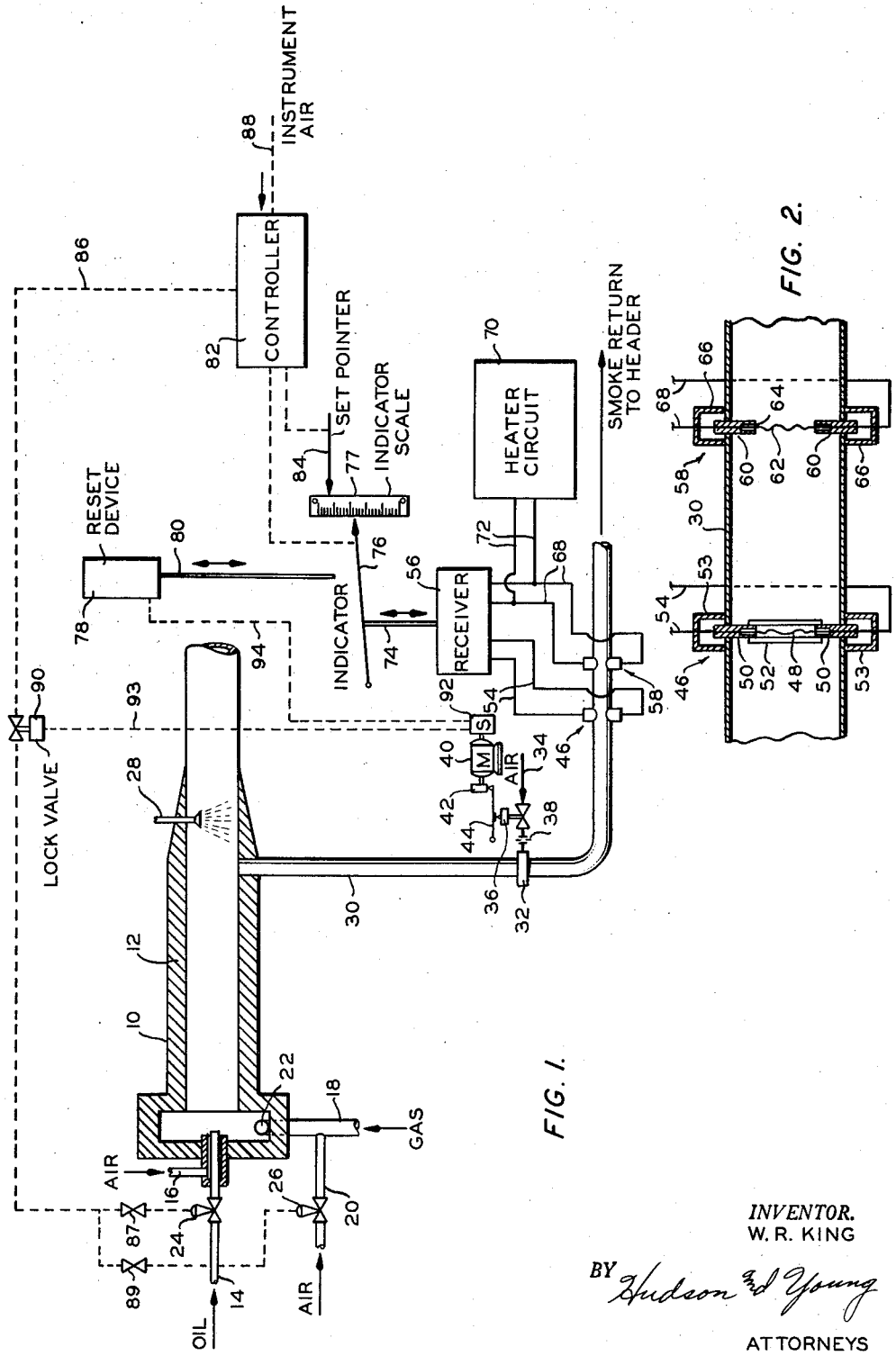
INVENTOR.
W. R. KING
BY Hudson and Young
ATTORNEYS

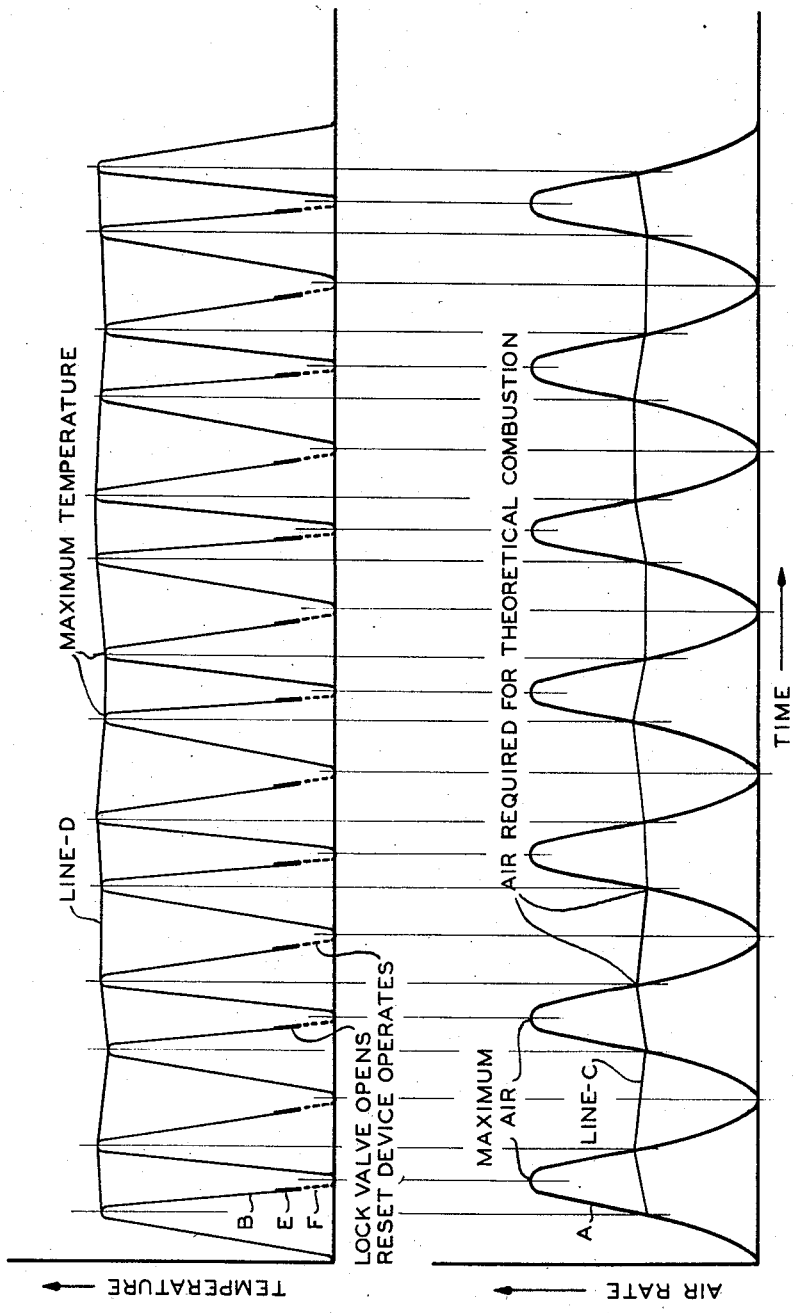

United States Patent Office
2,892,684
Patented June 30, 1959

2,892,684
METHOD AND APPARATUS FOR CARBON BLACK PRODUCTION

William R. King, Bartlesville, Okla., assignor to Phillips Petroleum Company, a corporation of Delaware Application April 9, 1956, Serial No. 576,881

17 Claims. (Cl. 23—209.6)

This invention relates to a method and apparatus for controlling the photelometer of carbon black produced by partial combustion of hydrocarbon material at elevated temperatures.

In recent years the so-called "furnace" carbon blacks have become increasingly important because of their superior characteristics for use in the rubber in tires for vehicles. The furnaces employed to produce these carbon blacks confine the combustion of a hydrocarbon fuel to a limited space. The air supplied is less than that required for complete combustion. The carbon-producing flames normally are quite large and in turbulent motion. After combustion, the carbon-laden gases are quenched and the carbon is separated from the gases by suitable means. In U.S. Patents 2,564,700 and 2,375,795, furnaces of this type are disclosed which preferably use hydrocarbon oils as conversion stocks. The oil is introduced axially into a cylindrical combustion chamber, and air on a combustible mixture is introduced in a direction tangential to the side wall of the chamber. The resulting carbon black is superior for many purposes to the blacks produced by other known methods.

In operating furnaces of these types, it is known that the quality of the conversion oil, the temperature in the furnace, and the residence time of the combustible mixture in the reaction chamber affect the quality of the carbon black. Residence time and temperature are functions of feed rates to the furnace. Heretofore, it has been customary to control the quality of the produced carbon black by a Photelometer test. In such a test, two grams of the black is slurried with 50 milliliters of a transparent solvent such as chloroform, toluene, benzene, acetone, xylene or carbontetrachloride. The slurry is heated to the boiling point in one to two minutes and then filtered. The filtrate is cooled and placed in the photelometer cell. Radiation is passed through the cell and the transmission is measured. The per cent transmission is referred to as the "photelometer reading," and serves to indicate the tarry residue present in the carbon black. The feed rates to the furnace can be controlled in response to this reading to obtain a desired product. While this control procedure is satisfactory to produce a high quality black, the furnace operation may deviate from the desired conditions between the times the photelometer tests are made. A closer degree of control is desirable.

Accordingly, it is an object of the invention to provide a method and apparatus for controlling the character and yield of carbon black produced in a carbon black reactor or furnace. Another object is to provide a method and apparatus for varying the ratio of oxygen to hydrocarbon in the feed to a carbon black reactor which effects more accurate control of the photelometer of the product. A further object is to provide a method and apparatus which produces a carbon black of more nearly uniform photelometer than has heretofore been possible. It is, also, an object of the invention to increase the yield of carbon black in the production of carbon black by partial oxidation of hydrocarbon feed in a furnace or reactor. Other objects of the invention will become apparent from a consideration of the accompanying disclosure.

In accordance with the invention a small proportion of the effluent smoke from a carbon black reactor is taken off in a sampling line and mixed with a variable amount of air or other free-oxygen-containing gas and the mixture is subjected to catalytic oxidation in contact with an oxidation catalyst such as a platinum wire heated to oxidizing temperature. The amount of air introduced to the sample stream is varied from a quantity less than the theoretical air-gas mixture to a quantity greater than necessary for the theoretical air-gas mixture so that during the burning step the temperature of the stream at the burning zone passes through a maximum when the quantity of air is proper for the theoretical mixture. This maximum temperature, which is obtained at regular intervals, or at least periodically, is utilized thru a system of instrumentation to vary the ratio of oxygen to hydrocarbon in the feed to the carbon black reactor. In actual practice it is more practical to sense the temperature of the air-smoke mixture prior to the burning step and utilize the temperature differential between this temperature and the maximum combustion temperature as the controlling factor. This technique compensates for fluctuations in the temperature of the sample stream prior to the combustion step. Another aspect of the invention comprises measuring the B.t.u. value of the effluent gas from a carbon black reactor and regulating the ratio of oxygen to hydrocarbon in the feed to the reactor in response to variations in B.t.u. values so as to control the photelometer of the product black.

The invention is based upon the discovery that the photelometer of the carbon black produced from a carbon black producing furnace or reactor is directly related to the amount of combustible gases present in the effluent smoke from the reactor and to the B.t.u. content of a unit volume thereof. Hence, the maximum temperature obtained by burning the combustible gases in a sample effluent stream with a varying amount of oxygen (air), which increases from less than the theoretical to more than the theoretical amount necessary for the complete combustion of the combustible gases in the sample stream, provides an accurate control of the ratio of oxygen to hydrocarbon in the feed to the reactor to obtain a constant photelometer. The maximum temperatures obtained are a function of the B. t. u. value of the effluent gas from the carbon black reactor.

A more complete understanding of the invention may be had from consideration of the accompanying schematic drawing of which Figure 1 is a plan view of a preferred arrangement of apparatus for effecting the invention; Figure 2 is a cross-sectional view of a section of the sampling line of Figure 1 containing the temperature sensing devices therein; and Figure 3 is a graph showing the relation of temperature and air flow rate to time, using apparatus arranged in accordance with the invention.

Referring to Figure 1, a furnace or reactor 10 having insulated walls 12 is provided with an axial oil inlet line 14 and an auxiliary air line 16. Line 18 introduces a mixture of fuel gas and air from line 20 tangentially to the furnace thru one or more ports 22. Variable control valves 24 and 26 are provided in oil line 14 and air line 20, respectively. A water quench means 28 extends into the effluent end of the furnace to provide suitable quenching of the effluent smoke. The furnace structure described thus far is conventional and may be varied in accordance with other types of conventional carbon black producing furnaces.

An effluent sampling line 30 connects with the downstream end of the furnace, preferably upstream from the quench means 28. A bustle type feed ring 32 is positioned in line 30 and is connected with an air line 34. A variable control valve 36 and an orifice 38 (intermediate the control valve and feed ring 32) are positioned in air line 34 for controlling the rate of flow of air into the sampling line. A timer motor 40 on which is positioned a cam 42 varies the flow rate of air permitted by valve 36 thru mechanical linkage 44 so as to provide minimum and maximum flow rates in a cycle of operation which are above and below, respectively, the amount of air necessary for a theoretical air-gas mixture.

A temperature sensing device 46 is positioned in line 30 downstream of feed ring 32 for the purpose of sensing the temperature of the air-gas mixture before combustion is effected. This temperature sensing device, as shown in Figure 2, comprises a wire 48 positioned across conduit 30 and insulated therefrom by means of insulating plugs 50 extending through the walls of the conduit in sealed relation therewith. A metal tube 52 encloses wire 48 to protect the same from carbon deposition. The outer end of plug 50 is enclosed in sealing cap 53, made of insulating material. The ends of wire 48 are connected by a pair of wires 54 with a receiver 56 so that small current variations in wire 48 are transmitted to receiver 56.

A second temperature sensing device 58 is positioned in conduit 30 downstream of device 46 for the purpose of inducing combustion of the combustible gases in the sample stream with the oxygen introduced thereto thru line 34. As shown in Figure 2, device 58 comprises a pair of insulating plugs 60 extending thru conduit 30 in sealed relation therewith and supporting a platinum wire 62 between its inner ends. The inner ends of plugs 60 are drilled or otherwise shaped to provide a cylindrical cavity 64 through which the wire extends so as to avoid deposition of carbon at the juncture of the wire with the plug. This arrangement maintains these cavities in hot condition so that carbon does not deposit on the walls thereof. A sealing cap of insulating material 66 is positioned around the outer end of plug 60 and is suitably attached to conduit 30 to form a seal therewith. A pair of wires 68 connect with the ends of platinum wire 62 and with receiver 56. Wires 68 are connected with a low-voltage heater circuit 70 by means of wires 72 whereby the platinum wire 62 is heated to a temperature which assists, together with the catalytic action of wire 62, in effecting combustion of the combustible gaseous components flowing in conduit 30 in the vicinity of device 58.

Receiver 56 is provided with a push rod 74 which moves in accordance with variations in maximum temperature sensed by device 58 and transmitted to the receiver. Push rod 74 raises an indicator 76 but does not lower this indicator. Indicator 76 operates in conjunction with an indicator scale 77. At intervals selected by the timer a reset device 78 resets indicator 76 against push rod 74, or back to zero, by means of arm 80. Pneumatic controller 82 is operatively connected with indicator 76 and to a set pointer 84. The controller 82 varies the output pressure in line 86 as the indicator 76 passes above and below the position of set pointer 84. Receiver 56, push rod 74, indicator 76, indicator scale 77, set pointer 84, and controller 82 are all components of a conventional temperature controller.

Controller 82 is supplied with instrument air thru line 88. Control line 86 leading from the controller is connected either with valve 24 in oil line 14 or with valve 26 in air line 20, depending upon whether it is desired to vary the flow of oil or the flow of air in order to vary the ratio of oxygen to oil or hydrocarbon in the feed to reactor 10. Valves 87 and 89 permit cutting out either valve 24 or valve 26 from control of controller 82. A lock valve 90 is positioned in air line 86 and is normally closed so as to hold air pressure in the section of line 86, between the lock valve and the flow control valve at the pressure in line 86 at the time valve 90 closes. Valve 90 is closed except while the indicator is at maximum at which time it is opened by switch 92 which is connected with timer motor 40 and operates in a time cycle synchronized with the variation of air flow rate thru line 34 into the sample stream in conduit 30. Switch 92 operates lock valve 90 thru line 93. Reset device 78 is also controlled by switch 92 thru line 94.

Reset device 78 may comprise a motor valve, a bellows, or a solenoid which extends and withdraws arm 80 under the control of switch 92 which in turn may comprise an air switch or an electrical switch. Likewise, lock valve 90 may be either air operated or electrically operated. Air operation of both valve 90 and reset device 78 is preferred.

Referring to Figure 3, curve A passes from a minimum to a maximum valve and back to a minimum in one cycle representing air flow rate to the sample stream. Line C passes thru points on curve A at which the air rate is just that required for complete combustion of the combustible gases in the sample stream (no excess oxygen). It should be noted that curve B, representing temperature, reaches peaks at line D at precisely the time at which curve A intersects line C in each instance.

In the lower portion of descending curve B as shown by the heavy line section E, the lock valve 90 is opened by the timer and related instruments, to permit readjustment of air pressure exerted upon the controlled valve (24 or 26). At the termination of a short period valve 90 is again closed by the timer and reset device 78 is operated by the timer as shown in dotted section F. It is also feasible to time the opening of valve 90 and operation of the reset device to coincide with any portion of curve B between adjacent peaks. Because of the possible fluctuation of line C toward either the top or bottom of curve A, the operation of lock valve 90 and reset device 78 is timed to permit such fluctuation without danger of improper timing.

The operation of carbon black furnace 10, with the exception of the specific regulation of valve 24 or valve 26 in accordance with the invention described herein, is conventional and discussion of any specific process of making carbon black in such a furnace is regarded as unnecessary. A sample of smoke is withdrawn from the reactor, preferably, upstream of the quench point (28) in order to eliminate the variation in gas composition that would be caused by any fluctuation in the quench water rate. The sample tube adjacent reactor 10 is preferably made of quartz or ceramic material and is small enough to limit the gas flow to the desired volume. Black does not adhere to the hot surface of this section of the tube, thereby avoiding plug up. The next section of the sampling conduit is a larger stainless steel section which is sized to cool the sample to less than 1100° F. so that it can be handled in a carbon steel conduit. Air is injected into the smoke by the method illustrated in and discussed with reference to Figure 1. The timer 40 and cam 42 operate air pressure regulator or valve 36 to vary the air pressure across orifice 38 and, as a consequence, the air flow rate thru the orifice varies. The air flow need not be measured and the only requirement is that it varies from less than to more than the amount of air required for a theoretical air-gas mixture with the amount of combustible gases flowing in the sample tube. A range of 1/10 to 10 times the amount of theoretical air or any other convenient range may be utilized. Also, the range need not remain constant as long as a theoretical mixture is reached at two points in a cycle, once on increasing air rate and again on decreasing air rate.

The air-smoke mixture flows over heated platinum wire 62 which is held at a fixed base temperature by a constant low-voltage current. The tendency to short out the wire is maintained at a minimum by using a very low voltage (0.5 to 1.0) volts which has little tendency to force current thru black and the special insulator 60 utilized at each end of the wire. Surface combustion of the gas-air mixture occurs on the platinum wire and raises its temperature. The increase in the resistance of the wire caused by its increased temperature is measured by a resistant pyrometer conveniently enclosed in receiver 56 which is part of a commercial temperature controller. When the theoretical air-gas mixture is reached the measured temperature reaches a peak or maximum. Variations in initial gas temperature, voltage, and resistance are compensated for by temperature sensing element 46 placed upstream of device 58 but shielded from the gas stream.

A standard recorder controller may be used and the reading taken as the peak temperature. The instrument is calibrated by comparison to photelometer tests so as to provide the proper control of valve 24 or valve 26, as the case may be. A standard controller may be used in the arrangement of apparatus with the modification that the indicator is not directly linked to the receiver but is simply pushed to the maximum and is held there by friction. The controller output is blocked by valve 90 except near the midpoint and near the end of a cycle, and after enough time has elapsed for the controller to operate, valve 90 again blocks controller air and the indicator is moved back to zero by reset device 78. The reset device and controller lock valve are actuated by the timer motor on a fixed sequence as indicated in Figure 3 of the drawing.

Carbon black is carried by the gases in sampling conduit 30 does not burn under the conditions maintained in the line and in the temperature sensing section of this line, hence, there is substantially no combusion of carbon around platinum wire 62 so that increase in temperature in this area, as sensed by device 58, is a function of the concentration of combustible gases in the sample stream.

When platinum wire 62 reaches a maximum temperature as the quantity of introduced air passes through the theoretical value, the reversible motor conventionally included in receiver 56 operates to raise push rod 74 to its maximum height. As the rate of addition of air into the gases passing thru the temperature cell is decreased to a minimum, the timer motor turns the switch to open lock valve 90. The lock valve remains open long enough for the pressure in line 86 downstream of the lock valve to become equal to that of the air pressure put out by controller 82 by which time the timer motor has turned the timer switch so that air will no longer be passed thru line 93 to lock valve 90 and this valve closes, thereby locking current air pressure on the diaphragm on controlled valve 24 or 26. The timer motor then turns switch 92 until air is passed to reset device 78 which contains a bellows that expands and pushes arm 80 against indicator 76 to effect the reset.

When the heat of combustion of the effluent sample from carbon black reactor 10 increases until the indicator is raised above the set pointer, the control valve 24 decreases the rate of flow of oil into the reactor; and when indicator 76 is not raised to the position of set pointer 84, the rate of addition of oil to the reactor is increased. If the control is applied to valve 26, the rate of air addition is increased when the indicator rises above the set pointer; and the rate of flow of air is decreased when the indicator does not rise to the set pointer. The control device described herein adjusts the controlled valve (24 or 26) only at the part of the cycle during which the rate of addition of air is near a minimum or near a maximum. However, the controlled valve can be reset by a modified arrangement only when the air addition is at a maximum or at a minimum rate.

To illustrate the invention without unnecessarily restricting same, the following example is presented utilizing apparatus illustrated in Figure 1.

*Example*

An oil of 90 BMCI is fed axially into a carbon black reactor at the rate of 155 g.p.h. with coaxial air at the rate of 3.29 M s.c.f.h. and with a tangential air rate of 55.38 M s.c.f.h. A steady stream of the effluent smoke is removed and cooled so that the temperature after air addition is about 300° F. Air is then added to the sample stream at varying rates from less than to more than the amount necessary to form a theoretical gas-fuel mixture. Then the rate of air addition is gradually decreased to the original minimum rate. The timer arrangement is adapted to increase the air rate from minimum to maximum over a 10 minute period followed by another 10 minute period of air rate decrease so that a complete cycle requires 20 minutes. During each cycle two maximum temperatures occur which are sensed by device 58 and compared by the receiver 56 with the temperature of the sample stream before combustion as sensed by device 46 and the resulting maximum is transferred to indicator 76 for translation to air pressure in line 86.

The set pointer is set at an arbitrary position during initial operation and, after the system is operating smoothly, the photelometer of the carbon black product is ascertained by conventional means. Then the set pointer is reset to raise or lower the photelometer as indicated by the photelometer of the product. Rechecking of actual photelometer may be desirable from time to time in order to check the accuracy of the set point.

After setting of the set pointer to obtain the desired photelometer, the arrangement of apparatus and instrumentation varies the ratio of oxygen to oil by either controlling the valve in the oil feed line or in the tangential air line to maintain a substantially constant photelometer as desired.

It has been found that as the photelometer of the carbon black product increases the yield of carbon black per gallon of oil decreases. The yield decreases very slowly until the photelometer reaches about 60 and as it increases from about 60 to about 85 the yield decreases slightly faster. However, when the photelometer increases from about 85 to 100 the yield decreases rapidly. The quality of carbon black of low photelometer is also low and a high photelometer black is desired. However, there is an optimum between quality and yield in a photelometer in the range of about 60 to 80.

In actual plant experience since the initial production of carbon black by the furnace process, the photelometer of the product has varied from 0 to 100 and it has been found practically impossible to maintain any semblance of constant photelometer or even a reasonable range of photelometer. Normally it is easier for the operators of a carbon black plant to operate at high photelometer but this seriously decreases the yield.

More uniform photelometer is also highly desirable from the standpoint of uniform product and uniform processing of products in which the black is used, such as in rubber and resinous materials. Hence yield and quality dictate a relatively constant photelometer in the range of about 60 to 80. It has been found that maintaining the photelometer more nearly uniform and in this range increases the yield of carbon black (as well as the uniformity of quality) over customary plant operation from about 3.1 to as high as 3.9 lbs./gal. of oil.

The elaborate timing and valving schedule is required to eliminate the need for metering and controlling accurately the flows of air and smoke. A simple continuous temperature controller will not work for the ensuing reasons:

(1) Sampling technique for metering or controlling smoke flows with any degree of accuracy, are unknown.

(2) The need of maintaining great accuracy in proportioning the flow of air and gas is eliminated. Even on clean gas flows, the metering and regulation of one gas flow in an exact proportion to another introduces a cascading of errors which is eliminated by this invention. For the same reason that a stopped clock is exactly correct twice a day the air-smoke proportion must be exactly on theoretical twice per cycle.

(3) The oxygen demand of the smoke will vary, thus excluding a set air smoke ratio controlled by conventional hookup.

Certain modifications of the invention will become apparent to those skilled in the art and the illustrative de-

I claim:

1. A method of controlling the photelometer of the carbon black product from a carbon black reactor in which a feed stream of free-oxygen-containing gas and a feed stream of hydrocarbon are reacted to partially oxidize said hydrocarbon, which comprises burning the combustible gases in a sample effluent product stream from said reactor in a combustion zone with a stream of free-oxgen-containing gas flowing at rates varying from less than, to more than, that required to burn all of said combustible gases and repeating the cycle of variation to obtain a series of maximum temperatures in the combustion zone, and controlling the ratio of oxygen to hydrocarbon feed to said reactor to control said maximum temperatures and thereby the photelometer of said carbon black.

2. The method of claim 1 wherein said oxygen-containing gas is air and said hydrocarbon is an oil.

3. In a process for producing carbon black by partial oxidation of a vaporizable hydrocarbon feed with a free-oxygen-containing gas in a reaction zone, the method of controlling the photelometer of the carbon black product at a substantially constant value comprising withdrawing a sample stream of the hot effluent gases from said reaction zone; feeding a stream of free-oxygen-containing gas into said sample stream and burning the combustible gases therein, said stream of oxygen-containing gas being varied from less than to more than the amount required for substantially complete combustion of the combustible gases in said sample stream so that a maximum temperature in the burning area in said stream is reached when the amount of oxygen corresponds to the amount for complete combustion; repeating the cycle of variation in the amount of oxygen-containing gas fed to said sample stream to obtain a series of maximum temperatures; and controlling the ratio of oxygen to hydrocarbon feed passing into said reaction zone to control said maximum temperature.

4. The method in claim 3 wherein the ratio of oxygen to hydrocarbon is regulated so as to maintain a photelometer in the range of 60 to 80.

5. The method in claim 3 wherein the difference between the temperature of said sample stream before the burning step and said maximum temperature is utilized to control said ratio.

6. The method in claim 5 wherein variation in the hydrocarbon feed rate is utilized to vary said ratio.

7. The method in claim 5 wherein variation in the oxygen-containing gas feed rate is utilized to vary said ratio.

8. The method in claim 3 including the steps of inducing said burning by contacting said sample stream containing added oxygen with a hot platinum catalyst; measuring the temperature of said sample stream after introduction of oxygen thereto and before the burning step and again in the burning zone to obtain said maximum temperature; and utilizing the difference in the sample stream temperatures before and during combustion to control the flow of hydrocarbon to said reaction zone.

9. The method in claim 3 including the steps of inducing said burning by contacting said sample stream containing added oxygen with a hot platinum catalyst; measuring the temperature of said sample stream after introduction of oxygen thereto and before the burning step and again in the burning zone to obtain said maximum temperature; and utilizing the difference in the sample stream temperatures before and during combustion to control the flow of oxygen-containing gas to said reaction zone.

10. Apparatus for controlling the photelometer of the carbon black product from a carbon black reactor which comprises in combination a carbon black reactor having feed means for injecting hydrocarbon and oxygen-containing gas thereinto and an effluent product line; a product sampling line communicating with the effluent product line; an oxygen line leading into said sampling line having a variable flow-control valve therein; a timer operatively connected with said flow-control valve for operating said valve thru a cycle from a minimum to a maximum flow therethrough and repeating the cycle; a combustion catalyst in said sampling line downstream of said oxygen line; temperature sensing means in said sampling line adjacent said catalyst; flow control means in said feed means for controlling the ratio of oxygen to hydrocarbon passing to said reactor; and control means sensitive to said temperature sensing means and operatively connected with the flow control means in said feed means so as to control said ratio in response to variations in the sensed temperature.

11. The apparatus of claim 10 including a second temperature sensing means in said sampling line upstream of first said temperature sensing means communicating with said control means and wherein said control means is responsive to the differential temperature between the temperature sensing means.

12. The apparatus of claim 11 wherein said catalyst comprises a platinum metal wire insulated from said line and in circuit with said control means; said control means comprises a temperature controller; and including a current source in circuit with said platinum metal wire for heating same.

13. The apparatus of claim 10 wherein said feed means includes separate hydrocarbon and oxygen feed lines and the flow control means associated therewith comprises a flow control valve in this hydrocarbon line.

14. The apparatus of claim 10 wherein said feed means includes separate hydrocarbon and oxygen feed lines and the flow control means associated therewith comprises a flow control valve in this oxygen line.

15. Apparatus for controlling the photelometer of the carbon black product from a carbon black reactor which comprises in combination a carbon black reactor having feed means for injecting hydrocarbon and oxygen-containing gas thereinto and an effluent product line; a product sampling line communicating with the effluent product line; an oxygen line leading into said sampling line having a variable flow-control valve therein; timer means operatively connected with said flow control valve so as to vary the flow from a minimum to a maximum and repeat the cycle; catalyst means in said sampling line downstream of said oxygen line for effecting combustion of combustible gases therein; temperature sensing means for sensing the temperatures in said line upstream of said catalyst and adjacent said catalyst; a pneumatic temperature controller sensitive to the temperature differential between said temperatures and adapted to control output air pressure from the controller; an air-operated flow-control valve in said feed means; and an air line connecting said controller with last said valve.

16. The apparatus of claim 15 including a lock valve in said air line and control means for said lock valve operatively connected with said timer means.

17. The apparatus of claim 16 wherein said timer means is operatively connected with said controller to reset same at regular intervals.

References Cited in the file of this patent

UNITED STATES PATENTS

| | | |
|---|---|---|
| 1,321,063 | Lamb et al. | Nov. 4, 1919 |
| 1,643,155 | Eisenschitz | Sept. 20, 1927 |
| 1,644,123 | Griswold | Oct. 4, 1927 |
| 1,959,242 | Kennedy | May 15, 1934 |
| 2,368,828 | Hanson et al. | Feb. 6, 1945 |
| 2,533,430 | Chase | Dec. 12, 1950 |
| 2,667,410 | Pierce | Jan. 26, 1954 |
| 2,762,568 | Sullivan | Sept. 11, 1956 |